(12) United States Patent
Chickering et al.

(10) Patent No.: US 8,032,375 B2
(45) Date of Patent: Oct. 4, 2011

(54) USING GENERIC PREDICTIVE MODELS FOR SLOT VALUES IN LANGUAGE MODELING

(75) Inventors: David M. Chickering, Bellevue, WA (US); Timothy S. Paek, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1245 days.

(21) Appl. No.: 11/378,202

(22) Filed: Mar. 17, 2006

(65) Prior Publication Data

US 2007/0219974 A1    Sep. 20, 2007

(51) Int. Cl.
*G10L 11/00* (2006.01)
*G10L 15/00* (2006.01)
*G06N 3/08* (2006.01)

(52) U.S. Cl. ........ 704/255; 704/231; 704/251; 704/270; 704/275; 706/25

(58) Field of Classification Search .................. 704/255, 704/270
See application file for complete search history.

(56) References Cited

U.S. PATENT DOCUMENTS

| | | | |
|---|---|---|---|
| 4,713,778 A | 12/1987 | Baker | |
| 4,748,670 A | 5/1988 | Bahl et al. | |
| 5,005,203 A | 4/1991 | Ney | |
| 5,479,576 A * | 12/1995 | Watanabe et al. | ............ 706/25 |
| 6,044,347 A | 3/2000 | Abella et al. | |
| 6,233,570 B1 | 5/2001 | Horvitz et al. | |
| 6,262,730 B1 | 7/2001 | Horvitz et al. | |
| 6,301,560 B1 | 10/2001 | Masters | |
| 6,388,592 B1 * | 5/2002 | Natarajan | ............ 341/107 |
| 6,434,523 B1 | 8/2002 | Monaco | |
| 6,694,296 B1 | 2/2004 | Alleva et al. | |
| 6,836,760 B1 | 12/2004 | Bellegarda et al. | |
| 6,839,680 B1 | 1/2005 | Liu et al. | |
| 6,957,184 B2 | 10/2005 | Schmid et al. | |
| 6,993,586 B2 | 1/2006 | Chen et al. | |
| 7,031,908 B1 | 4/2006 | Huang et al. | |
| 7,200,559 B2 | 4/2007 | Wang | |

(Continued)

FOREIGN PATENT DOCUMENTS

EP    0899737 A2    3/1999

(Continued)

OTHER PUBLICATIONS

U.S. Appl. No. 11/170,998, filed Jun. 29, 2005, Paek et al.

(Continued)

*Primary Examiner* — Justin Rider
(74) *Attorney, Agent, or Firm* — Lee & Hayes, PLLC

(57) ABSTRACT

A generic predictive argument model that can be applied to a set of shot values to predict a target slot value is provided. The generic predictive argument model can predict whether or not a particular value or item is the intended target of the user command given various features. A prediction for each of the slot values can then be normalized to infer a distribution over all values or items. For any set of slot values (e.g., contacts), a number of binary variable s are created that indicate whether or not each specific slot value was the intended target. For each slot value, a set of input features can be employed to predict the corresponding binary variable. These input features are generic properties of the contact that are "instantiated" based o n properties of the contact (e.g., contact-specific features). These contact-specific features can be stored in a user data store.

15 Claims, 14 Drawing Sheets

<br>

300

| Predicate | Category | Example |
|---|---|---|
| 1. Launch | APPLICATION | "Start Pocket Word." |
| 2. Reminders | CALENDAR | "Reminders off." |
| 3. Appointment | CALENDAR | "What's my next meeting?" |
| 4. General | MEDIA | "What song is this?" "Next track." |
| 5. Play | MEDIA | "Play jazz." "Play Missa Solemnis." |
| 6. Shuffle | MEDIA | "Turn shuffle on." |
| 7. Call | PHONE | "Call Max at home." "Redial" |
| 8. Dial | PHONE | "Dial four two five..." |
| 9. Show | PHONE | "Show Max Chickering." |
| 10. Battery | STATUS | "What's the battery level?" |
| 11. Date | STATUS | "What is the current date?" |
| 12. Flight Mode | STATUS | "Set flight mode off." |
| 13. Missed Calls | STATUS | "What calls did I miss?" |
| 14. Ringer | STATUS | "Set ringer to soft." |
| 15. Set Profile | STATUS | "Set profile to Max." |
| 16. Signal | STATUS | "What's my signal strength?" |
| 17. Time | STATUS | "What time is it?" |

U.S. PATENT DOCUMENTS

| | | | |
|---|---|---|---|
| 7,203,909 B1 | 4/2007 | Horvitz et al. | |
| 7,389,234 B2 | 6/2008 | Schmid et al. | |
| 7,415,414 B2* | 8/2008 | Azara et al. | 704/270 |
| 7,451,079 B2* | 11/2008 | Oudeyer | 704/205 |
| 7,454,717 B2* | 11/2008 | Hinckley et al. | 715/863 |
| 7,461,059 B2* | 12/2008 | Richardson et al. | 707/5 |
| 7,467,353 B2* | 12/2008 | Kurlander et al. | 715/744 |
| 7,472,118 B2* | 12/2008 | Hirst | 707/4 |
| 7,509,321 B2* | 3/2009 | Wong et al. | 707/7 |
| 7,512,906 B1* | 3/2009 | Baier et al. | 715/866 |
| 7,526,794 B2* | 4/2009 | Chand et al. | 726/2 |
| 7,539,724 B1* | 5/2009 | Callaghan | 709/205 |
| 7,565,663 B2* | 7/2009 | Knight et al. | 719/318 |
| 2001/0016814 A1 | 8/2001 | Hauenstein | |
| 2001/0047265 A1 | 11/2001 | Sepe, Jr. | |
| 2002/0013706 A1 | 1/2002 | Profio | |
| 2002/0123876 A1 | 9/2002 | Pokhariyal et al. | |
| 2002/0152071 A1 | 10/2002 | Chaiken et al. | |
| 2003/0009335 A1 | 1/2003 | Schalkwyk et al. | |
| 2003/0195739 A1 | 10/2003 | Washio | |
| 2004/0023656 A1 | 2/2004 | Purdy et al. | |
| 2004/0254957 A1 | 12/2004 | Hyotyniemi et al. | |
| 2004/0267518 A1 | 12/2004 | Kashima et al. | |
| 2005/0038650 A1 | 2/2005 | Bellegarda et al. | |
| 2005/0154580 A1 | 7/2005 | Horowitz et al. | |
| 2006/0009973 A1 | 1/2006 | Nguyen et al. | |
| 2006/0025997 A1 | 2/2006 | Law et al. | |
| 2006/0129396 A1 | 6/2006 | Ju et al. | |
| 2006/0129397 A1 | 6/2006 | Li et al. | |
| 2006/0173686 A1 | 8/2006 | Hwang | |
| 2006/0190253 A1 | 8/2006 | Hakkani-Tur et al. | |
| 2006/0277031 A1 | 12/2006 | Ramsey | |
| 2007/0233497 A1 | 10/2007 | Paek et al. | |
| 2007/0239453 A1 | 10/2007 | Paek et al. | |

FOREIGN PATENT DOCUMENTS

| | | |
|---|---|---|
| GB | 2390930 A | 1/2004 |

OTHER PUBLICATIONS

U.S. Appl. No. 10/718,138, filed Nov. 20, 2003, Wang.
U.S. Appl. No. 09/585,834, filed Jun. 1, 2000, Huang.
U.S. Appl. No. 10/447,399, filed May 29, 2003, Wang.
Chickering. "A Bayesian approach to learning Bayesian networks with local structure." (1997) Proceedings of the 13th Conference on Uncertainty in Artifical intelligence, pp. 80-89.
"Speech Recognition grammar specification version 1.0." http://www.w3.org/TR/speech-grammar/ last viewed Mar. 17, 2006, 88 pages.
Horvitz, et al. "Harnessing Models of Users' Goals to Mediate Clarification Dialog in Spoken Language Systems." (2001) 11 pages.
Horvitz, et al. "In pursuit of effective hansdfree decision support: coupling Bayesian interface, speech understanding, and user models" (1995) pp. 3-13.
Johansson. "User Modeling in dialog systems" (2002) Technical Report SAR 02-2, Santa Anna IT Research, 24 pages.
Oviatt. "Predicting hyperarticulate speech during human-computer error resolution" (1998) Speech Communication,. pp. 87-110.
Paek, et al. "Conversation as action uncertainty" (2000) Proceedings of the 16th Conference on Uncertainty in Artifical Intelligence, pp. 455-464.
Roseenfeld. "Two decades of statistical language modeling: where do we go from here?" (2000) Proceedings of the IEEE, 11 pages.
Rosenfeld. "Universal speech interfaces" (2001) Interactions, pp. 34-44.
Webb, et al. "Machine Laerning for User Modeling" (2001) User Modeling and User-Adapted Interaction, pp. 19-29.
Widmer, et al. "Learning in the presence of concept drift and hidden contexts" (1996) Machine Learning, pp. 69-101.
Chickering. Technical Report MSR-TR-2002-103. (2002) 3 pages.
Wang, et al. "Improved Name Recognition with User Modeling" Proceedings of the Eurospeech Conference (2003) 4 pages.
Fonix-Freedom of Speech. "About Fonix VoiceDial" http://www.fonixspeech.com/pages/voicedial.php last viewed Mar. 17, 2006,1 page.
Fonix-Freedom of Speech. "About Fonix VoiceDial 2.1" http://www.fonixspecch.com/pages/voicedial2_1.php last viewed Mar. 17, 2006, 1 page.
Fonix-Freedom of Speech. "About Fonix VoiceCentral" http://www.fonixspeech.com/pages/voicecentral.php last viewed Mar. 17, 2006, 1 page.
Jelinek. "Statistical Methods for Speech Recognition" MIT Press Cambridge, MA (1997).
Woods. "Language Processing for Speech Understanding" Computer Speech Processing. Prentice-Hall International (1983) pp. 304-334.
Akiba et al., "Selective Back-Off Smoothing for Incorporating Grammatical Constraints into the N-Gram Language Model", Proceedings of the International Conference on Spoken Language Processing, Sep. 2002, vol. 2, pp. 881-884.
Balakrishna et al., "Automatic Creation and Tuning of Context Free Grammars for Interactive Voice Response Systems", Proceeding of NLP-KE'05, IEEE, Sep. 2005, 158-163.
Bell et al., "Real-time Handling of Fragmented Utterances", In the Proceedings of NAACL, Jun. 2001, 7 pgs.
Billsus, et al., "A Personal News Agent that Talks, Learns and Explains", Proceedings of the 3rd Annual Conference on Autonomous Agents, May 1999, pp. 268-275.
Dusan et al., "Adaptive Dialog Based Upon Mulitmodal Language Acquistition", Proceedings of the Fourth IEEE International Conference on Multimodal Interfaces, Oct. 2002, 6 pgs.
Gorrell, "Using Statistical Language Modelling to Identify New Vocabulary in a Grammar-Based Speech Recognition System", Proceedings of the 8th European Conference on Speech Communication and Technology (Eurospeech), Sep. 2003, pp. 2729-2732.
Han, et al., "Synthetic Character with Bayesian Network and Behavior Network for Intelligent Smartphone", Department of Computer Science, Yonsei University, Korea, KES, Sep. 2005, LNAI 3681, pp. 737-743.
Hockey et al., "Targeted Help for Spoken Dialogue Systems: Interlligent feedback improves naive users' performance", Proceedings of the EACL, Apr. 2003, pp. 147-154.
Kim, et al., "A Keyword Spotting Approach Based on Pseudo N-gram Language Model", SPECOM, 9th Conference Speech and Computer, Sep. 2004, 4 pgs.
Knight et al., "Comparing grammar-based and robust approaches to speech understanding: a case study", Eurospeech 2001, Scandinavia, Sep. 2001, 4 pgs.
Office Action dated Dec. 10, 2008 for U.S. Appl. No. 11/278,899, 18 pages.
Office Action dated Nov. 28, 2008 for U.S. Appl. No. 11/278,893, 21 pgs.
Paek et al, "Optimizing Automated Call Routing by Integrating Spoken Dialog Models with Queuing Models," Proc. of HLT-NAACL, May 2004, pp. 41-48.
Souvignier, et al., "The Thoughtful Elephant: Strategies for Spoken Dialog Systems", IEEE Transactions on Speech and Audio Processing, Jan. 2000, 12 pgs.
Thompson, et al., "A Personalized System for Conversational Recommendations", Journal of Artificial Intelligence Research 21, Jun. 2002, 30 pgs.
Wang et al., "Spoken Language Understanding", IEEE Signal Processing Magazine, Sep. 2005, pp. 16-31.
Webb et al., "Data-Driven Language Understanding for Spoken Language Dialogue", in Proceedings of the AAAI Workshop on Spoken Language Understanding, Jul. 2005, 7 pgs.

* cited by examiner

300

| Predicate | Category | Example |
|---|---|---|
| 1. Launch | APPLICATION | "Start Pocket Word." |
| 2. Reminders | CALENDAR | "Reminders off." |
| 3. Appointment | CALENDAR | "What's my next meeting?" |
| 4. General | MEDIA | "What song is this?" "Next track." |
| 5. Play | MEDIA | "Play jazz." "Play Missa Solemnis." |
| 6. Shuffle | MEDIA | "Turn shuffle on." |
| 7. Call | PHONE | "Call Max at home." "Redial" |
| 8. Dial | PHONE | "Dial four two five..." |
| 9. Show | PHONE | "Show Max Chickering." |
| 10. Battery | STATUS | "What's the battery level?" |
| 11. Date | STATUS | "What is the current date?" |
| 12. Flight Mode | STATUS | "Set flight mode off." |
| 13. Missed Calls | STATUS | "What calls did I miss?" |
| 14. Ringer | STATUS | "Set ringer to soft." |
| 15. Set Profile | STATUS | "Set profile to Max." |
| 16. Signal | STATUS | "What's my signal strength?" |
| 17. Time | STATUS | "What time is it?" |

| Device-Related |
|---|
| IsCalendarEnabled, AreContactsEnabled, IsMediaEnabled, IsPhoneEnabled, IsStartMenuEnabled, UserHardware {Pocket PC, Smart Phone}, NumContacts, NumAlbums, NumArtists, NumGenres, NumStartMenus |
| Time-Related |
| DayOfWeek, IsWeekend, TimeOfDay Morning, Afternoon, Evening, IsWorkingHour, Month |
| Predicate-Related |
| LastRule, MostFreqRule, FractOfMostFreqRuleToRest |
| Contact-Specific |
| UniformMass {Contact Perplexity}, NumFilledFields, HasPrefix, HasFirstName, HasMiddleName, HasLastName, HasSuffix, HasHome, HasCell, HasWork, HasCompanyName, IsSameAsLastItem, LastCallLocation {Home, Work, Mobile,...} |
| Periodic (Referring to both Predicates and Contact Items) |
| IsMostFreqWithinDay, IsMostFreqWithinHour, IsMostFreqWithin30Min, DurSinceLastInstance, FractOfDayMatches, FractOfHourMatches, FractToRest, FractWithinHour, FractWithin30Min, FractOfMostFreqDayMatches, FractOfMostFreqHourMatches, NumInstancesSoFar, TimeMatchesDayOfLast, TimeMatchesHourOfLast |

FIG. 5

USING GENERIC PREDICTIVE MODELS FOR SLOT VALUES IN LANGUAGE MODELING

CROSS REFERENCE TO RELATED APPLICATION(S)

This application is related to co-pending and commonly assigned U.S. application Ser. No. 11/378,024 filed on Mar. 17, 2006 and entitled USING PREDICTIVE USER MODELS FOR LANGUAGE MODELING ON A PERSONAL DEVICE WITH USER BEHAVIOR MODELS BASED ON STATISTICAL MODELING, the entirety of which is incorporated herein by reference.

BACKGROUND

Since the beginning of spoken language understanding research in the 1970s, people have dreamed of communicating with all kinds of devices and appliances using speech recognition. Today, much of this dream has been realized thanks in part to the development of slot-filling techniques for dialogue management. Slot-filling involves using a template or frame for recognizing an utterance where slots represent a particular type of data, such as a date, a stock ticker, etc., which take on certain values, such as Monday, MSFT, etc. When an utterance is recognized in a speech application, a dialogue management component tries to assign the most likely values for the slots of the utterance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A generic predictive argument model that can be applied to a set of slot values to predict a target slot value is provided. For example, the slot value can be a contact in a contact list, song in a play list, application in a launch list, etc. The generic predictive argument model can predict whether or not a particular value or item is the intended target of a user command given various features. A prediction for each of the slot values can then be normalized to infer a distribution over all values or items.

In prior research, statistical models for slots maintained an explicit distribution $p(C=c(g))$ (without input features) (e.g., over the contact list of the user). Furthermore, this distribution was either uniform or at most, it was based primarily on the frequencies of observing the different slot values. Here, a different approach was taken where for any set of slot values (e.g., contacts), a number of binary variables are created that indicate whether or not each specific slot value (e.g., contact) is the intended target $c(g)$. $B_{C=c}$ is used to denote the binary variable corresponding to $C=c$. For each slot value (e.g., contact), a set of input features can be employed to predict the corresponding binary variable. These input features are generic properties of the contact that are "instantiated" based on properties of the contact (e.g., contact-specific features). These contact-specific features can be stored in a user data store.

As an example, suppose there are three contacts in a user's contact list: Joe, Steve and Mary. In this case, there are three binary variables $B_{c(g)=Joe}$, $B_{c(g)=Steve}$ and $B_{c(g)=Mary}$, where $B_{c(g)=Joe}$ is defined to be true if Joe is the intended contact of the next goal (and similarly for the other two). To predict $B_{c(g)=Joe}$, the argument model instantiates the contact-specific feature HasCell for Joe, which indicates whether or not there is a cell phone number for Joe. When predicting $B_{c(g)=Mary}$, the corresponding value for the HasCell feature instead indicates whether or not there is a cell phone number for Mary.

In this approach to building an argument model, a single model that predicts every binary B variable is learned using as training data all the contacts for every user. In other words, a single generic contact model is learned that applies to every specific contact in any user's list. In one example, the argument model can be applied to all the contacts in a contact list. In another example, the argument model is restricted to those seen contact item(s) that had been shown or called at least once so far—and using a uniform distribution for the remaining unseen items—the performance of the argument model can be improved.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

BRIEF DESCRIPTION OF THE DRAWINGS

FIG. 3 is a table listing exemplary predicate functions by category.

FIG. 5 is a table illustrating different types of exemplary features used for predicting the next user goal.

DETAILED DESCRIPTION

Figure 1:
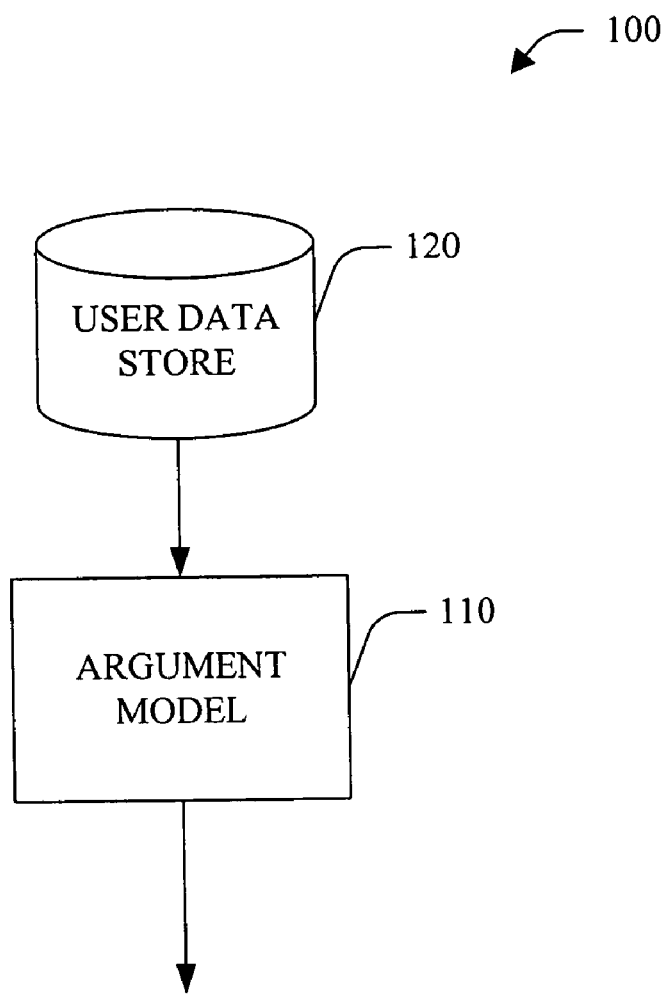
FIG. 1 is a block diagram of a generic predictive argument model.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Additionally, "personal device" refers to a device which can be personalized for an individual user of the device. Pride of ownership is evident in the way users personalize their devices through backgrounds, skins, ring tones, etc. People generally tend to be creatures of habit, so individual users oftentimes display systematic patterns of usage for their personal devices. Personal device can include, for example, a desktop computer system, a notebook computer system, a personal digital assistant, a media player, a mobile phone, a smart phone, a remote control and the like.

Referring to FIG. 1, a system for prediction of a target slot value 100 is illustrated. The system 100 includes an argument model 110 that can be applied to a set of slot values to predict the target slot value. For example, the slot value can be a contact in a contact list, song in a play list, application in a launch list etc. The argument model 110 can predict whether or not a particular value or item is the intended target of the user command given various features. A prediction for each of the slot values can then be normalized to infer a distribution over all values or items.

In prior research, statistical models maintained an explicit distribution $p(C=c(g))$ (without input features) (e.g., over the contact list of the user). Here, a different approach was taken where for any set of slot values (e.g., contacts), a number of binary variables were created that indicated whether or not each specific slot value (e.g., contact) was the intended target $c(g)$. $B_{C=c}$ is used to denote the binary variable corresponding to $C=c$. For each slot value (e.g., contact), a set of input features can be employed to predict the corresponding binary variable. These input features are generic properties of the contact that are "instantiated" based on properties of the contact (e.g., contact-specific features). These contact-specific features can be stored in a user data store 120.

As an example, suppose there are three contacts in a user's contact list: Joe, Steve and Mary. In this case, there are three binary variables $B_{c(g)=Joe}$, $B_{c(g)=Steve}$ and $B_{c(g)=Mary}$, where $B_{c(g)=Joe}$ is defined to be true if Joe is the intended contact of the next goal (and similarly for the other two). To predict $B_{c(g)=Joe}$, the argument model instantiates the contact-specific feature HasCell for Joe, which indicates whether or not there is a cell phone number for Joe. When predicting $B_{c(g)=Mary}$, the corresponding value for the HasCell feature instead indicates whether or not there is a cell phone number for Mary.

In this approach to building a contact-argument model, a single model that predicts every binary B variable is learned using as training data all the contacts for every user. In other words, a single generic contact model is learned that applies to every specific contact in any user's list, as discussed in greater detail below.

In one example, this model can be applied to all the contacts in a contact list. In another example, the argument model is restricted to those seen contact item(s) had been shown or called at least once so far—and using a uniform distribution for the remaining unseen items—the performance of the argument model can be improved.

Figure 2:
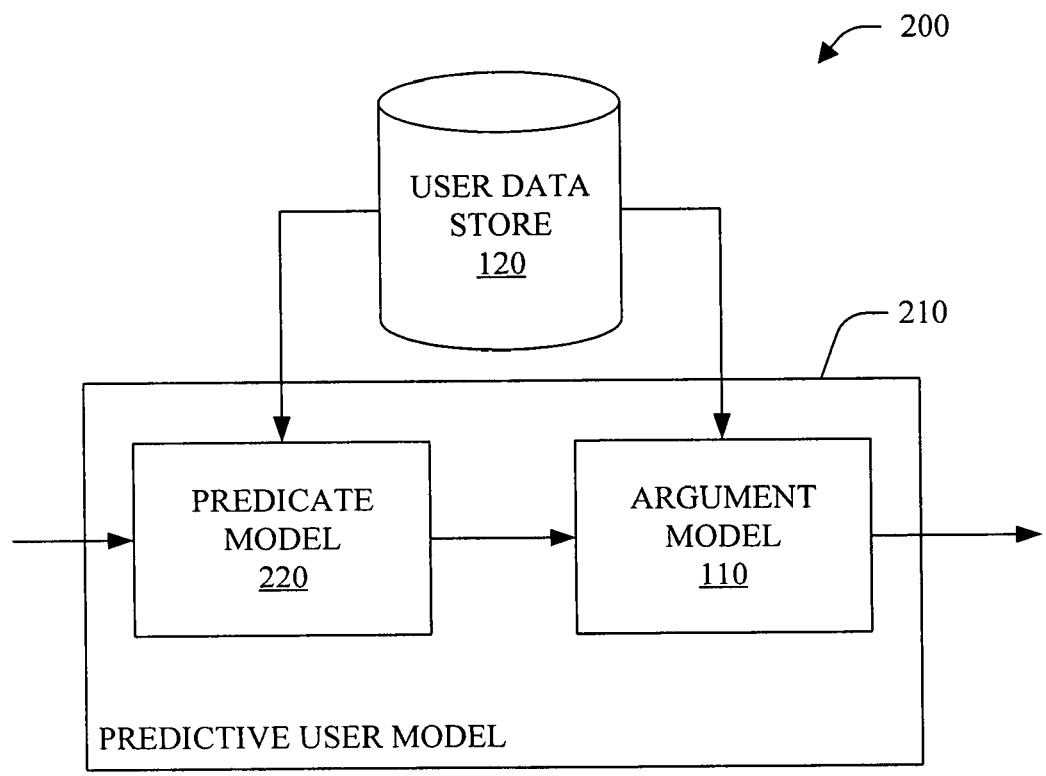
FIG. 2 is a block diagram of a system for prediction of a user goal.

Turning briefly to FIG. 2, the argument model 110 can be employed as a component of a system for prediction of a user goal 200. The system 200 employs statistical model(s) that can predict a command based, at least in part, on past user behavior. The system 200 can improve performance of command and control (C&C) speech recognition, as discussed greater detail below. For example, if a particular user calls a spouse at the end of every workday, the model can be adapted to weight that spouse more than other contacts during that time.

The system 200 can be employed in a mobile platform in which advantages of speech over other input modalities can be exploited as speech facilitates easier access to information through description rather than deictic reference, and acts as an "ambient medium" that allows users to do other things at the same time, instead of requiring more focused attention. These advantages help explain why voice dialing on mobile devices is so compelling. Perusing a large database of contacts and selecting an item of interest is not only inherently more difficult than simply describing the item desired (which people ordinarily know by heart), but it is orders of magnitude worse with confined input or limited screen real estate. Add to that the typical user scenario of divided attention and multitasking, where hands and eyes (e.g., referential devices) may be busy, and speech clearly dominates as the preferred modality. Further, the speech modality is scalable for use on mobile devices in contrast to visual or manual modalities.

The system 200 includes predictive user models 210 that receive a user input (e.g., spoken command) and employ statistical modeling to determine the likely command without regard to the actual content of the input (e.g., utterance). That is, the system 200 employs a behavior model (e.g., non-speech model) to determine probabilities of commands which can be combined with an acoustic model to arrive at a final probability, as discussed below.

For purposes of explanation, a commercial mobile device C&C speech application domain will be discussed. However, those skilled in the art will recognize that the system 200 can be employed with any suitable speech system domains (e.g., even with multiple slots such as telephony application) and all such domains are intended to be encompassed by the hereto appended claims.

Modeling the Domain

In this example, the domain encompasses the functionality of a commercial C&C speech application for mobile devices. With the exemplary C&C speech application, users can look up contacts, place phone calls, get calendar information, get device status information, control media and launch applications.

Because statistical models define probability distributions over random variables, the first step is to define the random variables corresponding to the domain. To simplify presentation, the following syntactic conventions can be adopted. A random variable is denoted by an upper-case token (e.g., A, $\Pi$) and a state or value of that variable by the same token in lower case (e.g., a, $\pi$). Sets of variables can be denoted with bold-face capitalized tokens (e.g., $\mathbf{A}$, $\mathbf{\Pi}$) and corresponding sets of values by bold-face lower case tokens (e.g., $\mathbf{a}$, $\boldsymbol{\pi}$).

Importantly, the statistical user models 210 define probability distributions over the intent or goal of the next user command in the application. For example, one goal might be to check the date. The application allows the user to express this goal in a number of ways, such as "What is the current date?" and "What day is it today?" The user models 210 do not distinguish between the wordings of the same goal.

For modeling purposes, it is convenient to decompose each user goal into two distinct parts. In this example, the first part of the user goal is defined by one of 17 different predicate functions (or predicates for short) that the application supports at the start of a C&C interaction. Referring briefly to FIG. 3, a table 300 lists the predicate functions by category along with example commands. The second part of the user goal is the (possibly constant) predicate argument. Some predicates, such as Call, take arguments based on content present on the device, such as a contact list. For all other predicates, the argument is constant and the predicate itself defines a goal.

Figure 4:
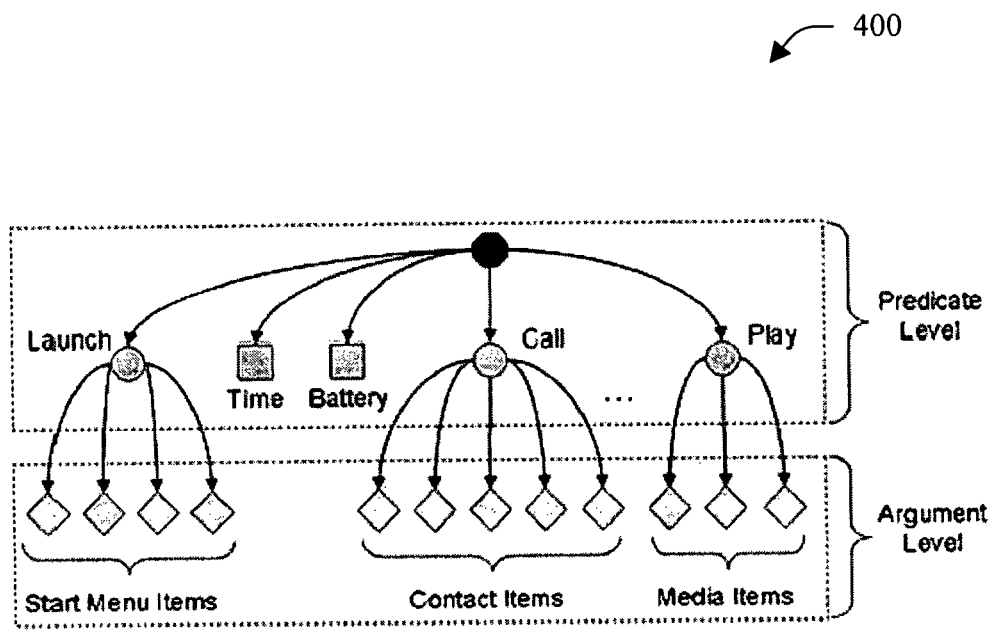
FIG. 4 is a tree illustrating decomposition of several user goals in an exemplary domain.

Turning to FIG. 4, a tree 400 illustrates decomposition of several user goals in this exemplary domain. The children of the root node (circles and squares) correspond to predicates, and the children of each predicate (diamonds) correspond to possible argument values. In this exemplary C&C speech application, the argument values include start menu items for the Launch predicate, contact items for the Call and Show predicates, and media items for the Play predicate. For leaf-node predicates (squares), the argument is constant, such as the Battery predicate. Note that the set of all user goals corresponds to the set of leaves in the tree 400.

More formally, let $\Pi$ denote the random variable whose values are the 17 different predicates available at the start of an interaction. For any predicate $\pi$, let $A_\pi$ denote the random variable whose values are the possible argument values for predicate $\pi$; for a predicate $\pi$ with a constant argument, $A_\pi$ is defined to be the constant zero. For example, if $\pi$ is the Launch predicate, then $A_\pi$ is a variable whose values correspond to the set of start menu items installed on the mobile device that can be launched using C&C. If $\pi$ is the Time predicate, then $A_\pi$ is a constant equal to zero.

Continuing, let G denote the random variable corresponding to the next user goal. <predicate, argument> pairs can be used to denote the values of G. For example, to denote the user goal, g<Launch, Application$_1$>, of launching Application$_1$:

g<Launch, Application$_1$>=
   {$\Pi=\pi_{Launch}$, $a_{Launch=Application_1}$}.

Similarly, to denote the user goal, g<Time> of checking the time:

g<Time>={$\Pi=\pi_{Time}$, $a_{Time}=0$}.

As previously described, all user goals correspond to leaves in the tree shown in FIG. 3. By denoting each value g as a pair, each leaf is described by the corresponding path from the root node to the leaf. Further, for any value g of the random variable G, $\pi(g)$ and $a(g)$ can be used to denote the individual predicate and argument value, respectively, of the pair.

Continuing with this example, the user model 210 uses a number of feature variables to predict the next user goal G, as described in greater detail below. For modeling purposes, F is used to denote the set of feature variables that are able to be observed when G is predicted. Conditioning the next user goal on observed feature variables, the model 210 defines the posterior probability over G as follows:

$$p(G=g|\mathbf{F}=\mathbf{f})=p(\Pi=\pi(g)|\mathbf{F}=\mathbf{f})\times p(A_{\pi(g)}=a(g)|\Pi=\pi(g), \mathbf{F}=\mathbf{f}) \qquad \text{Eq. (1)}$$

The first term in the right-hand side of Equation 1 can be referred to as the predicate model, and the second term in the right-hand side of Equation 1 can be referred to as the argument model. Note that the argument model is a function of the predicate. Also note that when the argument variable $A_{\pi(g)}$ for a goal g is constant, the argument model is simply defined to be unity.

Model Selection

For model selection, (1) conditional models, where the conditional distribution of interest (e.g., $p(\Pi|\bullet)$ or $p(A|\bullet)$) is modeled directly, and/or (2) generative models, where a joint distribution over the target variable of interest and the feature variables is constructed can be employed. For generative models, the target distribution is extracted from the joint distribution via probabilistic inference.

In one example, decision trees were chosen for the conditional models, and naïve-Bayes models for the generative models. In a naïve-Bayes model for a target T and set of features F, the joint distribution p(T, F) is represented as $p(T)\Pi_{F_i \in \mathbf{F}} p(F_i|T)$. This model makes the strong assumption that all the features are conditionally independent given the target.

In this example, the choice was partly motivated by the need to make sure that the learned models could be quickly and easily updated on a mobile device with a very small memory footprint. Conditional models can offer better classification accuracy for many domains, but naïve-Bayes may be better suited for online personalization because conditionally independent features often have less parameters to update for rapid tuning.

Continuing with this example, for building both conditional and generative models, the WinMine toolkit was used, which learns Bayesian networks employing decision trees to encode local conditional distributions. Splits in decision trees are made through greedy search guided by a Bayesian scoring function. For discrete variables, multinomial distributions in the leaves of the trees were learned. For continuous variables, Gaussian distributions in the leaves of the trees were learned.

Referring briefly to FIG. 2, as noted above, the predicted variable G is the next user goal which can be decomposed into models for predicting the next predicate (predicate model 220), and the next argument of the predicate (argument model 110). While Equation 1 applies to all predicates and arguments in the C&C application, for purposes of brevity, only argument models for the contact items will be described herein. However, those skilled in the art will recognize that the argument model 110 can be employed for any suitable argument types and the appended claims are intended to encompass all such argument types. Further, for purposes of discussion, the term "contact model" refers to an argument model specific to the contact items. In one example, contact-related commands constituted the majority of all commands made by users.

Feature Engineering

As noted previously, the system 200 receives a user input (e.g., spoken command) and employs statistical modeling to determine the likely command without regard to the actual content of the input (e.g., utterance). In particular, the system 200 employs features for predicting the next user goal which can be stored in the user data store 120.

Due, at least in part, to the intuition that the personal nature of personal devices such as mobile devices lends itself to statistical modeling. So, if a user calls a spouse at the end of every workday, or if a user listens to music every morning, it is desirous to generate features to capture that information.

In one example, in order to exploit this intuition, whereas it seemed reasonable to assume that individual users might display personal idiosyncrasies or systematic patterns of usage for the C&C application, whether or not these patterns might be consistent across all users remained to be seen empirically. In order to assess if systematic patterns of usage prevailed in the general population of users, the features, in one example, were engineered to capture these patterns such that the features were generalized across all users. For example, suppose one user calls a relative every Saturday while another user calls every Wednesday. If the system 200 only kept track of the day of the week as our feature, the system 200 could not pick out that pattern. Thus, in this example, what is needed is a periodic feature such as how often calls made to particular contact occur on the same day of the week.

Turning to FIG. 5, a table 500 which illustrates the different types of features used for predicting the next user goal in one example. For the contact model, all the features were used. For the general predicate model, contact-specific features were excluded. Note that with the periodic features, an item could be a particular predicate (e.g., Battery) or contact item (e.g., John Doe). Hence, in this example, for the predicate model 220, which defined a distribution over 17 possible predicates, periodic features were created for each of the predicates. Because there were 14 generic periodic features, well over two hundred periodic features for the predicate model 220 were employed. The information stored in the user data store 120 can include time-stamp information for spoken commands and/or pieces of device data associated with the features illustrated in FIG. 5.

Optionally, the predicate model 220 and/or the argument model 110 (e.g., contact model) can benefit from operating level information such as what applications are currently running, and application-level information, such as how many phone calls, emails and text messages had been received from particular contact items. This information can likewise be store in the user data store 120 for use by the system 200.

Building and Evaluating the User Models 210

Predicate Model 220

The predicate model 220 defines a distribution over the children of the root node in the tree of user goals shown in FIG. 3. In this example, in building a decision tree and naïve-Bayes model for the data, it was observed that only one feature was selected during structure learning: the last predicate. With only one predictive feature, the decision tree and the naïve-Bayes model represent almost identical distributions. Therefore, for purposes of brevity, only the conditional model is discussed herein.

Figure 6:
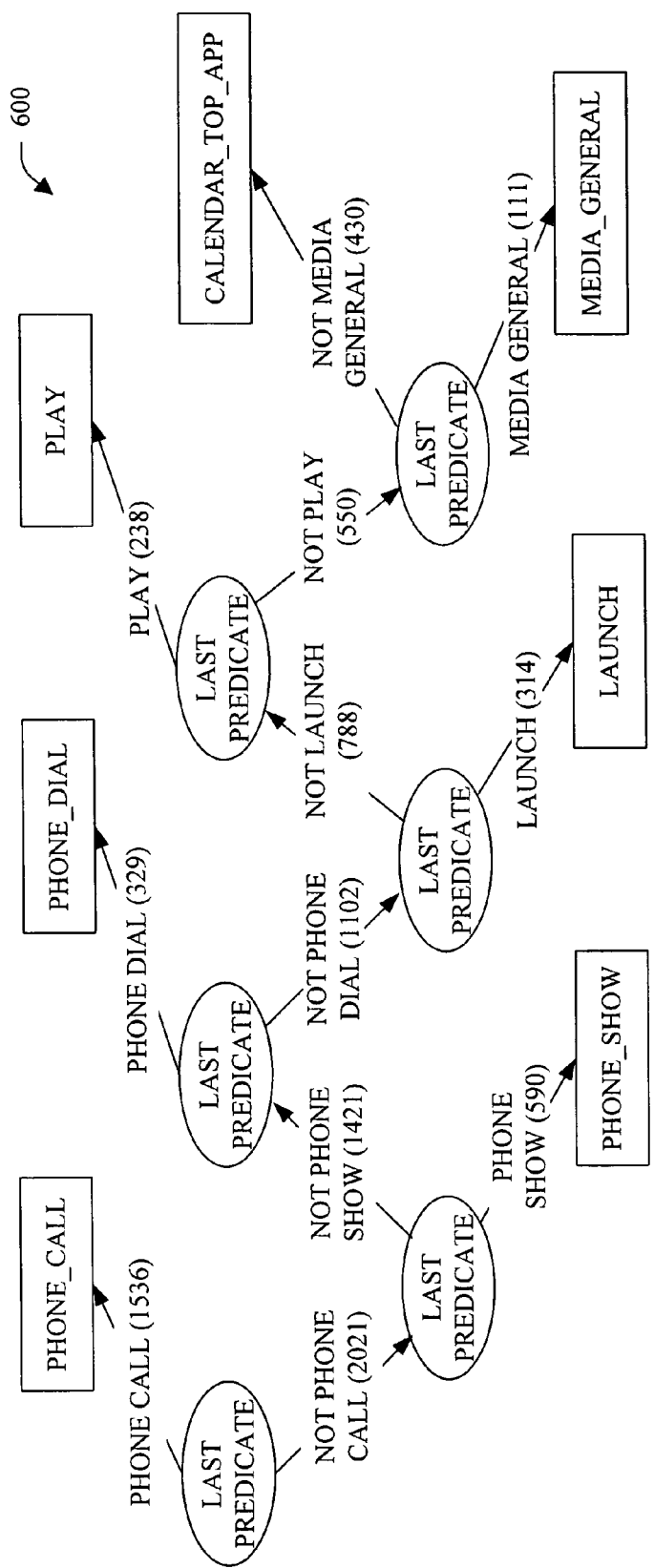
FIG. 6 is a diagram of a conditional distribution over predicates.

Referring to FIG. 6, a conditional distribution 600 for True Predicate, which defines a distribution over all the predicates is illustrated. The leaves of the conditional distribution 600 indicate what predicate is the most likely, given the path down the tree. Observing both the splits and the leaves, the conditional distribution 600 is, to a first approximation, characterizing an equality relation which states, in short, that the next predicate is likely to be just like the last one.

Contact-Argument Model

As discussed above, the perplexity of the domain for the predicate model 220 is relatively small. A more challenging prediction problem, due to the fact that users in one sample set had anywhere from 5 to over 2000 contacts on their mobile devices, is to determine which contact a user is likely to request.

Conditional and/or generative models can be built that predict the intended contact item of the Call or Show predicates. Models for the second term of Equation 1:

$$p(A_{\pi(g)}=a(g)|\Pi=\pi(g), F=f)$$

restricted to those situations in which $\pi(g)$ is either a Call or Show predicate are considered. The notation can be simplified by using the variable C for $A_{\pi(g)}$. Furthermore, leaving implicit the conditioning on the predicate $\Pi=\pi(g)$ $$p(C=c(g)|F=f) \qquad \text{Eq. (2)}$$

where c(g) is the contact associated with the user goal.

In prior research, statistical models maintained an explicit distribution p(C=c(g)) (without input features) over the contact list of the user. Here, an alternative approach was taken where for any set of contacts, a number of binary variables were created that indicated whether or not each specific contact was the intended c(g). $B_{C=c}$ is used to denote the binary variable corresponding to C=c. For each contact, a set of input features was created that can be used to predict the corresponding binary variable. These input features are generic properties of the contact that are "instantiated" based on properties of the contact. These input features can be called "contact-specific features". Exemplary contact-specific features are included in table 500 of FIG. 5. These contact-specific features can be stored in the user data store 120.

As discussed previously, suppose there are three contacts in a user's contact list: Joe, Steve and Mary. In this case, there are three binary variables $B_{c(g)=Joe}$, $B_{c(g)=Steve}$ and $B_{c(g)=Mary}$, where $B_{c(g)=Joe}$ is defined to be true if Joe is the intended contact of the next goal (and similarly for the other two). To predict $B_{c(g)=Joe}$, the argument model 110 instantiates the contact-specific feature HasCell for Joe, which indicates whether or not there is a cell phone number for Joe. When predicting $B_{c(g)=Mary}$, the corresponding value for the HasCell feature instead indicates whether or not there is a cell phone number for Mary.

In this approach to building a contact-argument model, a single model that predicts every binary B variable is learned using as training data all the contacts for every user. In other words, a single generic contact model is learned that applies to every specific contact in any user's list. Using f(c) to denote the contact-specific features corresponding to contact c, the argument model 110 represents, for any contact c, $$p(B_{C=c}=\text{true}|f(c)).$$

To use this model to construct p(C=c(g)|F=f), the values of $p(B_{C=c}=\text{true}|f(c))$ are normalized for all c:

$$p(C=c(g)|F=f) = \frac{p(B_{C=c(g)}=\text{true}|f(c(g)))}{\sum_{c'} p(B_{C=c'}=\text{true}|f(c'))} \qquad \text{Eq. (3)}$$

In one example, this model can be applied to all the contacts in a contact list. In another example, the argument model 110 is restricted to those seen contact item(s) had been shown or called at least once so far—and using a uniform distribution for the remaining unseen items—the performance of the argument model 110 can be improved. To describe this slight modification to the argument model 110, s can be used for the set of seen contacts. The probability p(seen) that the next contact will be a member of s can then be modeled, yielding the argument model 110 (contact model):

$$p(C=c(g)|F=f) = \qquad \text{Eq. (4)}$$

$$\begin{cases} p(\text{seen}) \cdot \dfrac{p(B_{C=c(g)} = \text{true}|f(c(g)))}{\sum_{c'} p(B_{C=c'} = \text{true}|f(c'))} & \text{if } c(g) \in s \\ (1-p(\text{seen})) \cdot \dfrac{1}{\sum_{c' \notin s} 1} & \text{otherwise} \end{cases}$$

To model p(seen), update the following fraction can be updated:

$$\frac{\sum_{c \in s} k(c) + 1}{N+2} \qquad \text{Eq. (5)}$$

where the function k(c) denotes the number of repeat requests for any seen contact so far, and N denotes the total number of requests made so far. Optionally, for smoothing, 1 was added to the numerator and 2 was added to the denominator.

Figure 7:
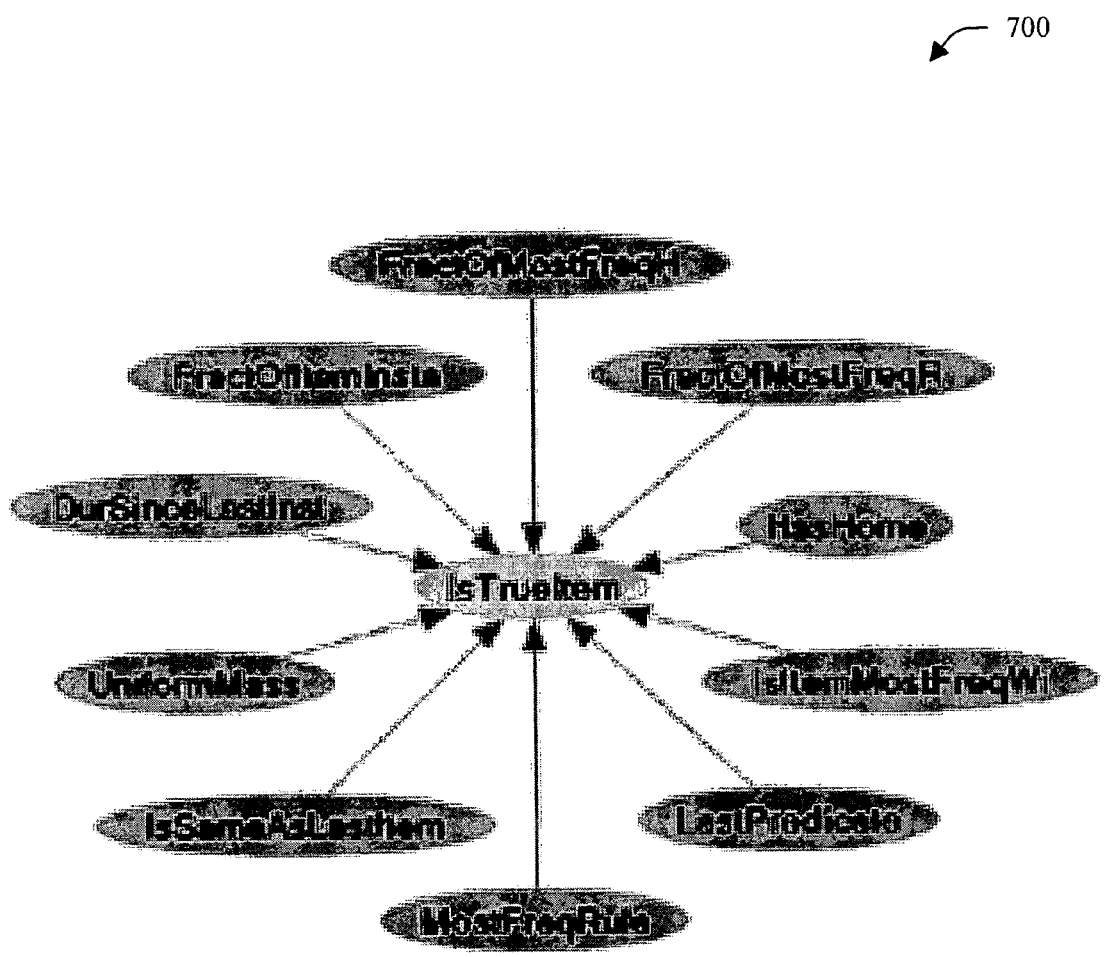
FIG. 7 is a diagram of a learned decision tree of a conditional model.
Figure 8:
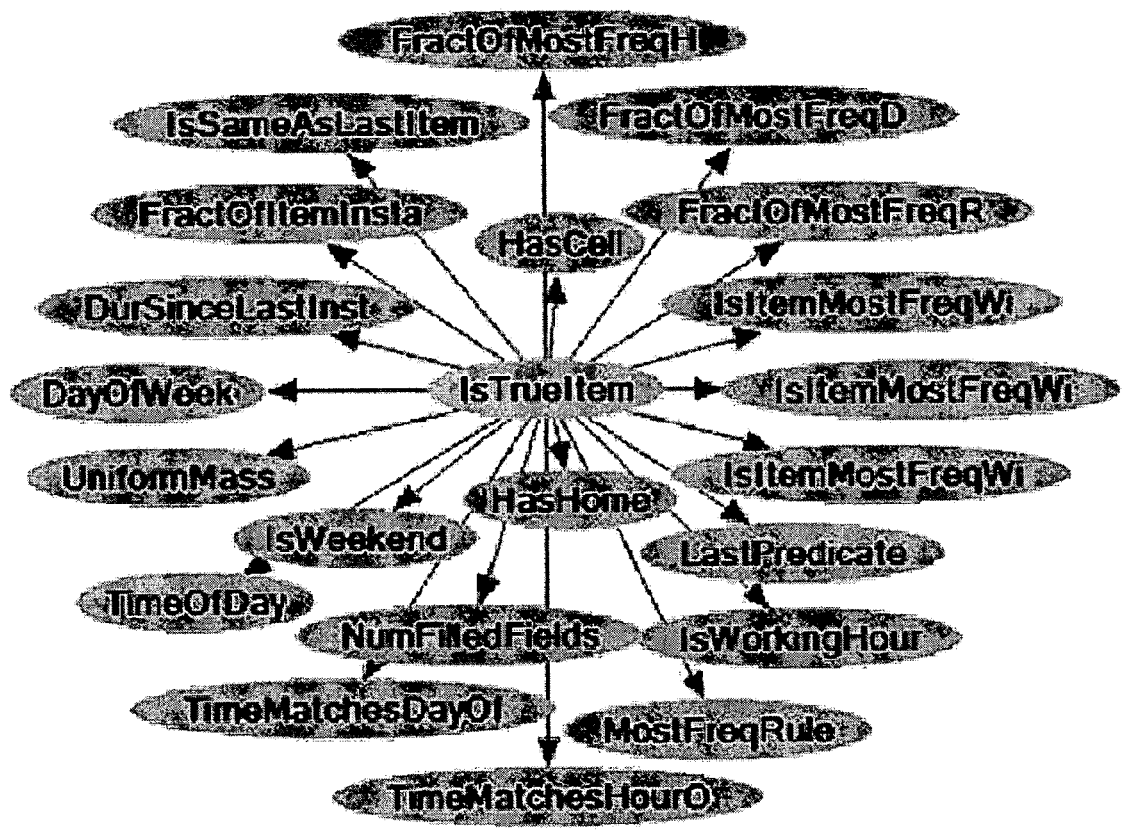
FIG. 8 is a diagram of a learned naïve-Bayes graphical model.

Similar to the predicate model 220, in one example, both a decision tree and a naïve-Bayes model were learned for $p(B_{C=c(g)}=\text{true}|f(c(g)))$. Referring briefly to FIGS. 7 and 8, a learned decision tree 700 of the conditional model and learned naïve-Bayes graphical model 800 are illustrated. The tree 700 displays the features that were split on in the decision tree within the conditional model. Not surprisingly, the naïve-Bayes graphical model 800 contains the same 10 features as the decision tree 700, but also 11 more. It is interesting that the majority of these additional features are time-related or periodic. Both the decision tree 700 and naïve-Bayes model 800 include the last predicate as a feature, which was the only feature selected in the predicate model.

Examining the conditional distribution for the decision tree 700 reveals a number of intuitive statistical patterns. For example, one path through the tree 700 stated that if a user is calling a contact for which a home number is available, and the last time that contact was called was less than 30 seconds ago, then it is 90% certain that the user is trying to call the contact again. In short, users try repeatedly to reach people they know.

Language Modeling

Although the user models 210 for predicting the next predicate (predicate model 220) and contact (argument model 110) achieved impressive classification accuracies and perplexity reductions, the overall goal is to improve C&C speech recognition. Thus, the user models 210 can be applied for language modeling.

Figure 9:
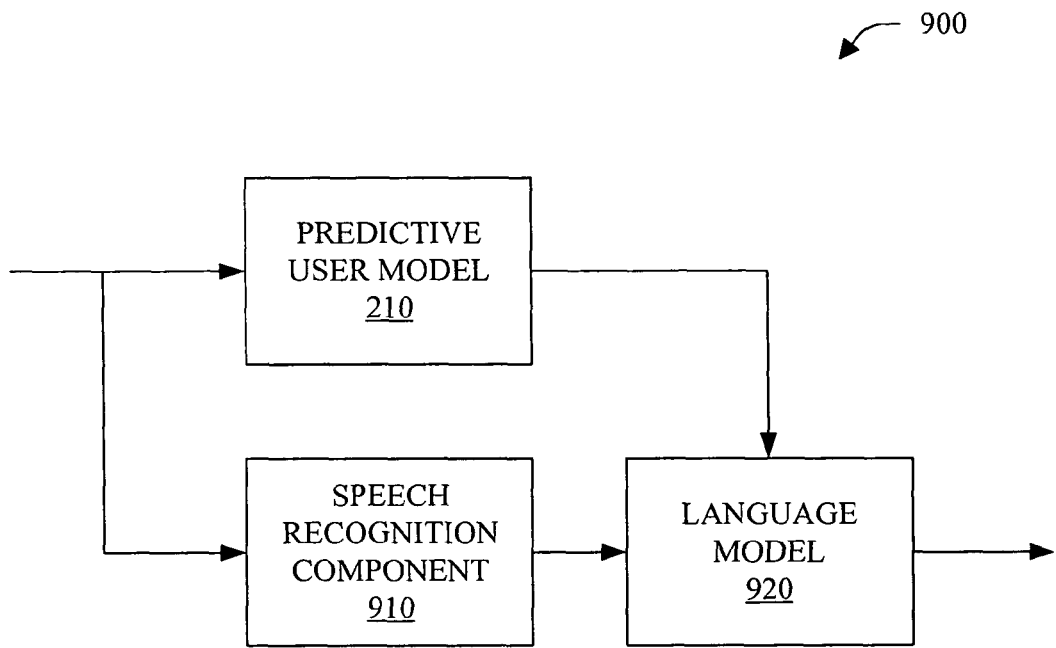
FIG. 9 is a block diagram of a language model system for prediction of a user goal for command/control of a personal device.

Referring to FIG. 9, a language model system 900 for prediction of a user goal for command/control of a personal device is illustrated. Language modeling for speech recognition is typically focused on obtaining a distribution over the possible words. In a speech application setting, however, what matters most is task completion. The task-completion goal is to identify the correct value of the goal variable G given an acoustic signal η. Using a Bayesian framework, the goal is to identify the value g of variable G that maximizes:

$$p(g|\eta,f) = \alpha \cdot p(\eta|g) p(g|f) \qquad \text{Eq. (7)}$$

where α is a normalization constant, and it is assumed that the acoustic signal is independent of the input features once the user goal is known. Using a speech recognition component 910 (e.g., Microsoft Speech API (SAPI)), which does not use the input features discussed above, the posterior probability distribution $p_{Uniform}(g|\eta)$ can be abstracted under the (not necessarily appropriate) assumption that every value g is equally likely apriori:

$$p_{Uniform}(g|\eta) = \alpha' \cdot p(\eta|g) \qquad \text{Eq. (8)}$$

where α' is another normalization constant. From Equations 7 and 8, a language model component 920 can obtain the posterior of interest by simply multiplying $p_{Uniform}$ from the speech recognition component 910 (e.g., SAPI) by the output of the predictive user model 210 and then renormalizing:

$$p(g|\eta,f) \propto p_{Uniform}(g|\eta) \cdot p(g|f). \qquad \text{Eq. (9)}$$

Online Personalization

In evaluating the predictive user models 210 applied to language modeling, in one experiment, without any online adaptation of model parameters, a 21% reduction in error rate relative to the performance of the current application was achieved. Optionally, model parameters of the predictive user models 210 can be personalized based on individual user data. Thus, idiosyncratic patterns of usage can be employed to improve the overall performance.

Adjusting the Learning Rate

As discussed previously, in one example, a decision tree was chosen as the conditional model and a naïve-Bayes model was chosen as the generative model. Significantly, these models can be updated easily in an online fashion. For both the conditional and generative models, local conditional distributions can be encoded as decision trees. The disadvantage of this is that the decision tree is committed to the splits and only the parameters at the leaves of the tree can be updated. Regardless, in updating the parameters in an online fashion, a decision is made as to how to set the learning rate, which defines how quickly model parameters are updated in light of new data.

Let β denote the learning rate. As described earlier, multinomial distributions are used in the leaves of the trees for discrete variables; let θ denote a current probability value from such a distribution within the model. For example, θ might denote the probability that the next predicate is a call. Using an online-update algorithm, a new estimate for θ can be obtained, denoted as θ', as follows:

$$\theta' = (1-\beta) \cdot \theta + \beta \cdot I$$

where I is the indicator function for whether the state corresponding to the parameter occurred or not (e.g., whether or not the next predicate was, indeed, a call).

For continuous variables, where Gaussian distributions were used, the parameters were updated in an analogous manner. The main difference is that in addition to a learning rate, an absolute "weight" was assigned to each data point; a constant absolute weight of one was used in the experiments described herein.

The learning rate can be kept constant, or it can be adjusted over time. In the conducted experiments, β was either set to a constant in the range from 0 to 0.25, or the following simple adjustment schedule was used, which we refer to as the cumulative learning rate:

$$\beta = \frac{ESS}{N + ESS}$$

where N is the total number of individual observations seen so far and ESS is the equivalent sample size of the training data. In the conducted experiments, the equivalent sample size was set to one to indicate that the model should treat the old data from which the parameters were trained as if it only had one sample. As N accumulates the learning rate gradually decreases, converging to zero.

It is to be appreciated that the system 100, the argument model 110, the user data store 120, the system 200, the predictive user model 210, the predicate model 220, the system 900, the speech recognition component 910 and/or the language model 920 can be computer components as that term is defined herein.

Turning briefly to FIGS. 10-13, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 10:
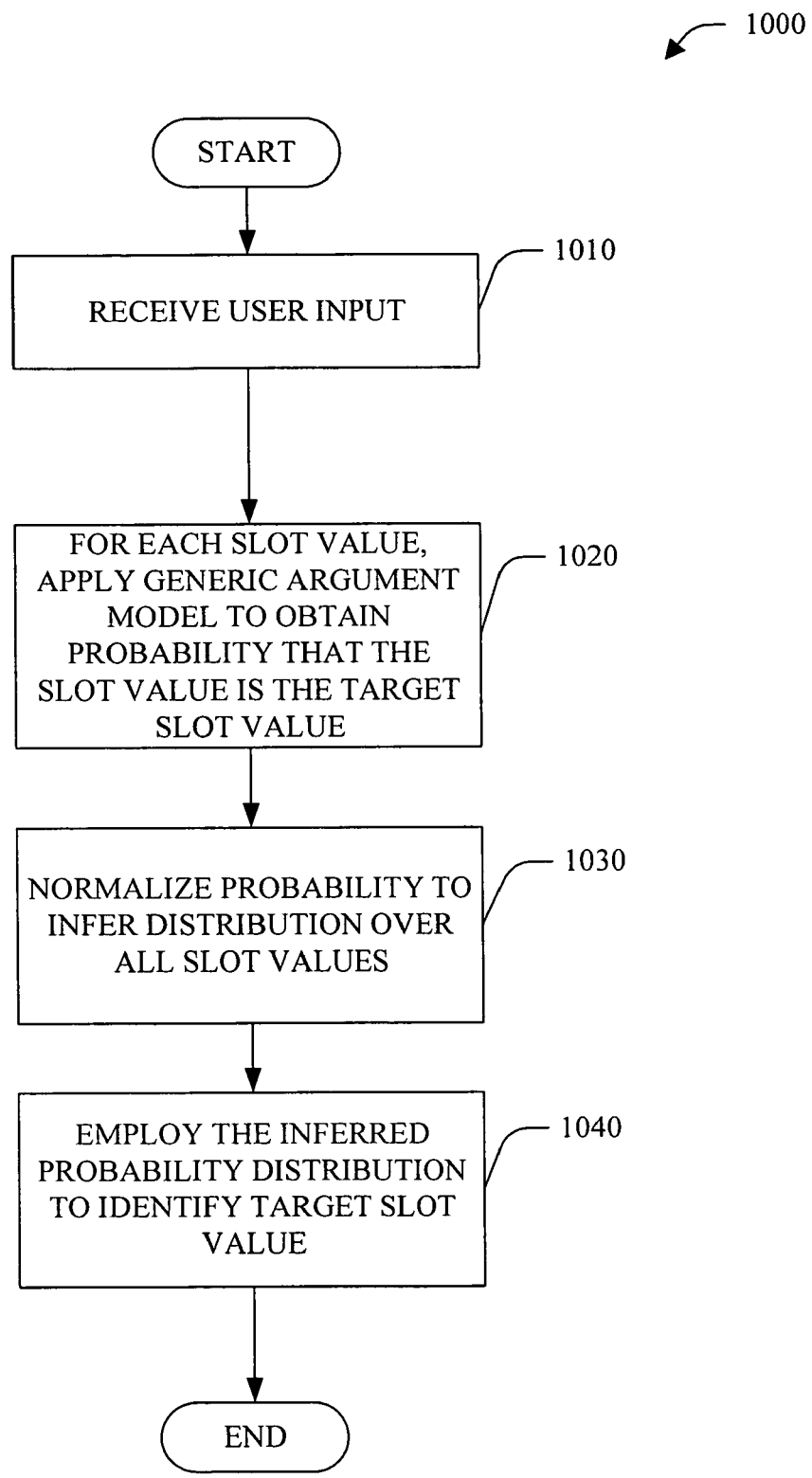
FIG. 10 is a flow chart of a method for prediction of a target slot value of a user goal for command/control of a personal device.

Turning to FIG. 10, a method for prediction of a target slot value of a user goal for command/control of a personal device 1000 is illustrated. At 1010, a user input (e.g., utterance) is received. At 1020, for each slot value, a generic argument model is applied to obtain a probability that the particular slot value is the target slot value. At 1030, the probabilities are normalized to infer a distribution over all slot values. At 1040, the inferred probability distribution is employed to identify the target slot value.

Figure 11:
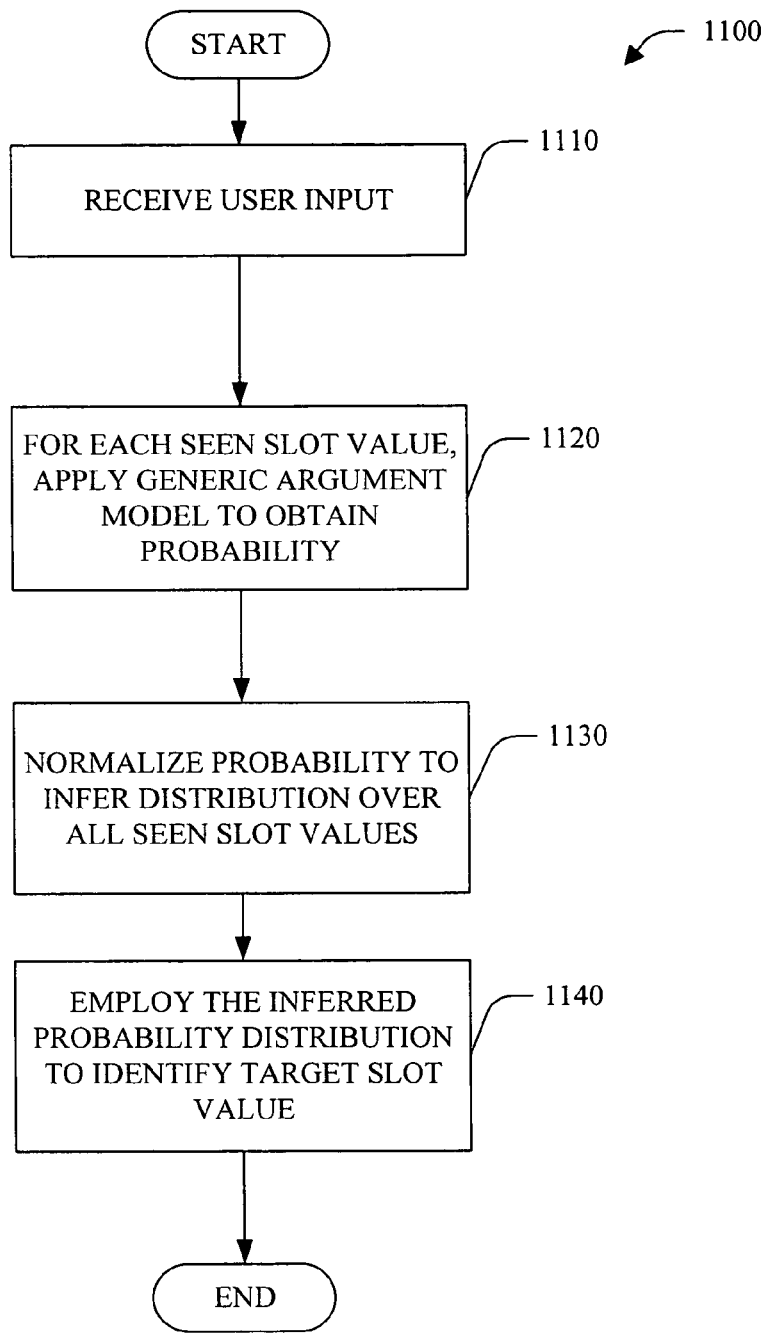
FIG. 11 is a flow chart of a method for prediction of a target slot value of a user goal for command/control of a personal device.

Referring to FIG. 11, a method for prediction of a target slot value of a user goal for command/control of a personal device 1100 is illustrated. At 1110, a user input (e.g., utterance) is received. At 1120, for each seen slot value, a generic argument model is applied to obtain a probability that the particular seen slot value is the target slot value. At 1130, the probabilities are normalized to infer a distribution over all seen slot values. At 1140, the inferred probability distribution is employed to identify the target slot value.

Figure 12:
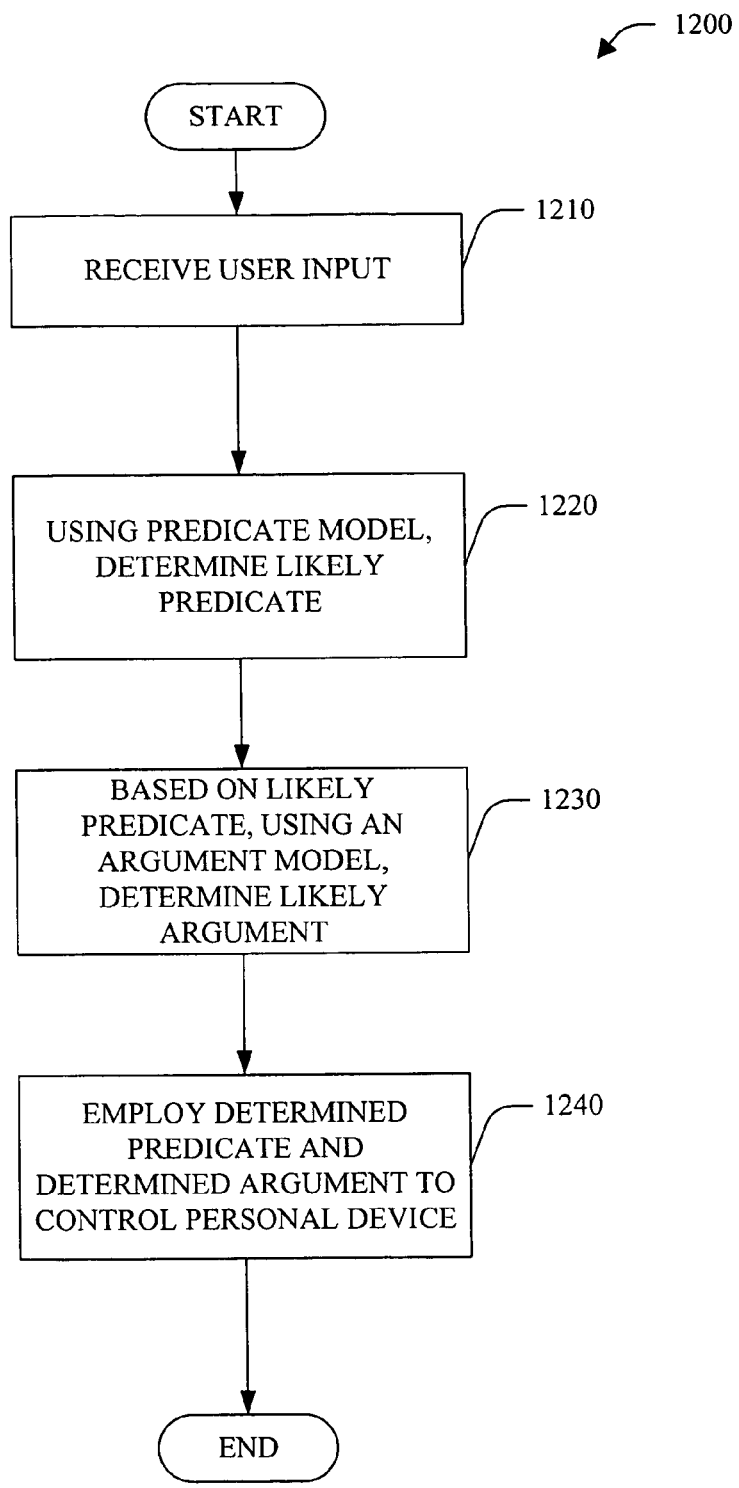
FIG. 12 is a flow chart of a method for prediction of a user goal for command/control of a personal device.

Turning to FIG. 12, a method for prediction of a user goal for command/control of a personal device 1200 is illustrated. At 1210, a user input (e.g., utterance) is received. At 1220, a predicate model is used to determine a likely predicate.

At 1230, based on the likely predicate, using an argument model, a likely argument (e.g., contact) is determined. At 1240, the determined predicate and determined argument are employed to control the personal device.

Figure 13:
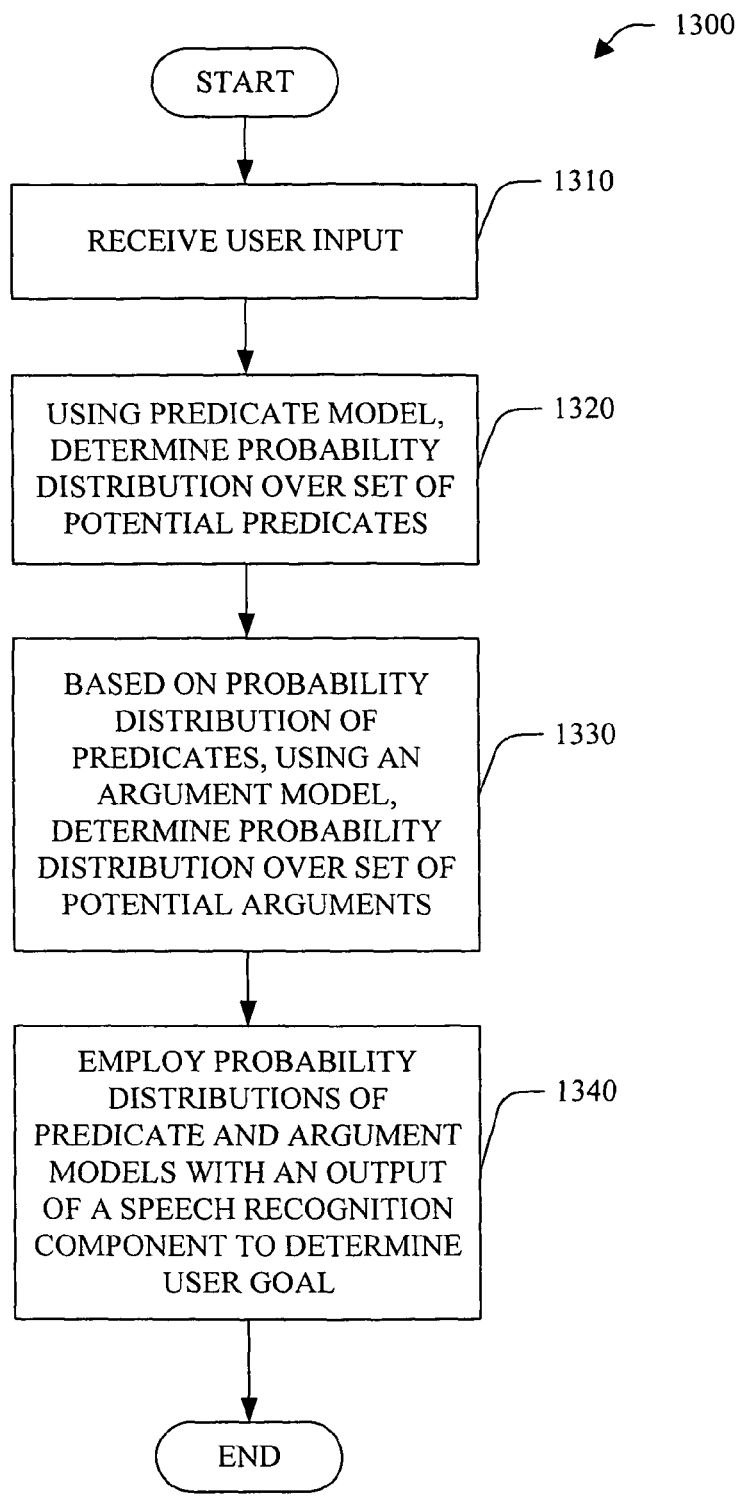
FIG. 13 is a flow chart of a method for prediction of a user goal for command/control of a personal device.

Next, referring to FIG. 13, a method for prediction of a user goal for command/control of a personal device 1300 is illustrated. At 1310, a user input is received. At 1320, a predicate model is used to determine a probability distribution of potential predicates is determined.

At 1330, based on the probability distribution of potential predicates, using an argument model, a probability distribution of potential arguments is determined. At 1340, the probability distributions are employed with an output of a speech recognition component determine the user goal.

Figure 14:
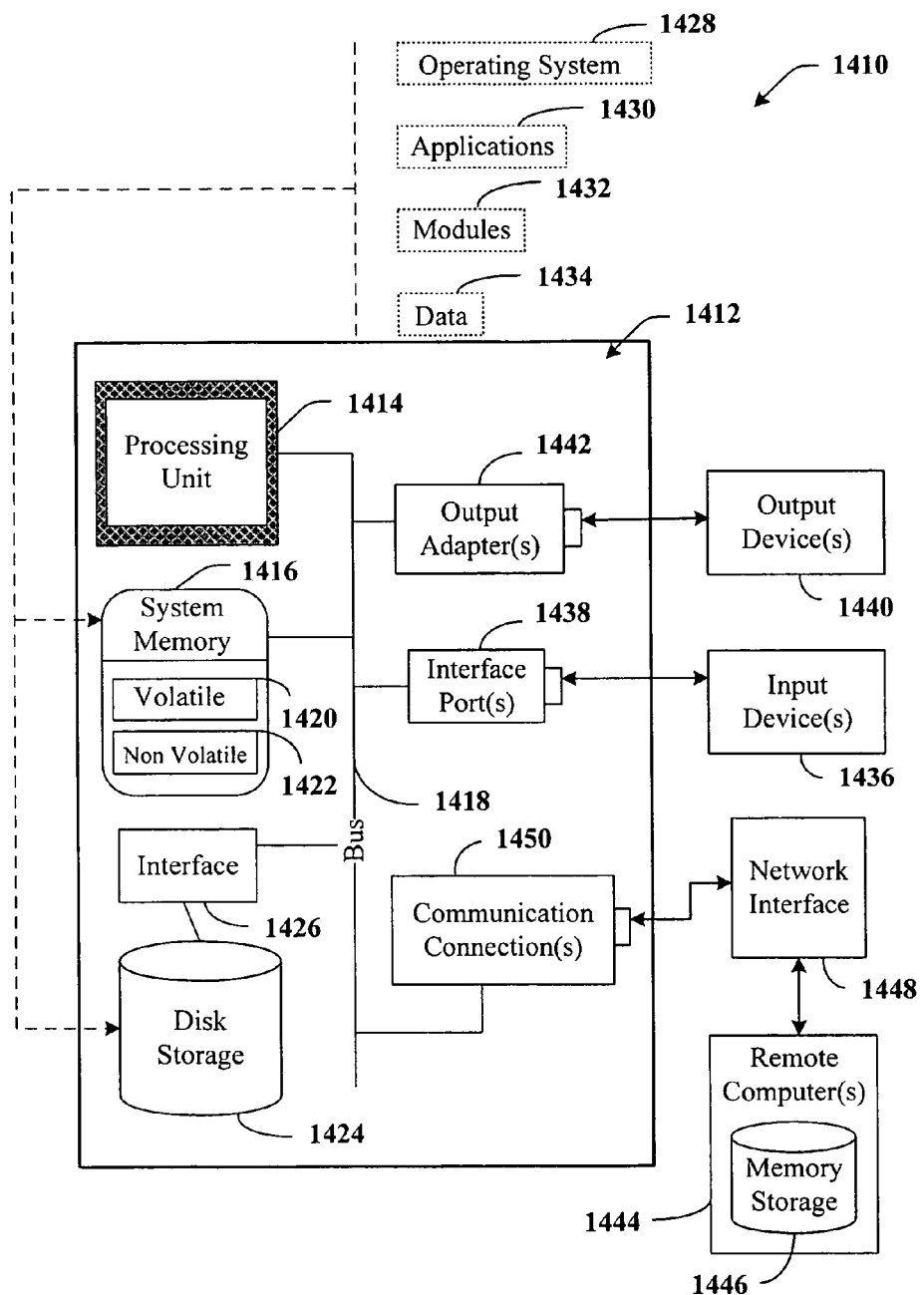
FIG. 14 illustrates an example operating environment.

In order to provide additional context for various aspects of the claimed subject matter, FIG. 14 and the following discussion are intended to provide a brief, general description of a suitable operating environment 1410. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for the prediction of a target slot value of a user goal, comprising:
    a user data store that stores information regarding user behavior, the information comprising a plurality of features associated with a user's behavior comprising at least one or more of a periodic feature, a contact-specific feature, a predicate-related feature, a time-related feature and a device-related feature, at least the periodic feature and the time-related feature being independent of content that is included in a user input; and
    an argument model that employs statistical modeling and the information stored in the user data store, the argument model is applied to each of a set of slot values to predict the target slot value by:
        for each of the set of slot values, determining a probability that the particular slot value is the target slot value,
        normalizing the probabilities of all of the slot values to infer a probability distribution over all of the slot values, and
        identifying the target slot value using the inferred probability distribution.

2. The system of claim 1, further comprising:
    a predictive user model that employs statistical modeling, the statistical modeling of the predictive user model is performed without regard to the substantive content of the user input.

3. The system of claim 1, wherein the argument model for unseen values is uniform.

4. The system of claim 1, wherein the argument model comprises a conditional model.

5. The system of claim 4, wherein the conditional model is a decision tree.

6. The system of claim 1, wherein the argument model comprises a generative model.

7. The system of claim 6, wherein the generative model is a naïve-Bayes model.

8. The system of claim 1, wherein the argument model is learned for a general user population.

9. The system of claim 1, wherein at least one of a parameter or a structure of the argument model is updated in an online manner.

10. The system of claim 9, wherein the online update is performed according to a learning rate.

11. The system of claim 1 employed for command/control of a personal device, wherein the personal device comprises a desktop computer system, a notebook computer system, a personal digital assistant, a media player, a mobile phone, a smart phone or a remote control.

12. A method for prediction of a target slot value of a user goal for command/control of a personal device, comprising:
receiving a user input at the personal device, the user input comprises at least one or more of a periodic feature, a contact-specific feature, a predicate-related feature, a time-related feature and a device-related feature, at least the periodic feature and the time-related feature being independent of content that is included in a user input;
for each of a set of slot values, applying a generic argument model on the user input by the user device to obtain a probability that the slot value is the target slot value;
normalizing the probabilities of the slot values to infer a distribution over the set of slot values; and
employing the inferred probability distribution to identify the target slot value.

13. The method of claim 12, wherein the probability distribution determined by the argument model is independent of a speech input.

14. The method of claim 12, wherein the set of slot values comprises seen slot values.

15. A language model system for prediction of a user goal for command/control of a personal device, comprising:
a predictive user model that comprises an argument model that employs statistical modeling and information stored in a user data store, the information stored in the user data store comprises a plurality of features associated with the particular user's behavior, the features comprising at least one or more of a periodic feature, a contact-specific feature, a predicate-related feature, a time-related feature and a device-related feature, at least the periodic feature and the time-related feature being independent of content that is included in a user input, the argument model is applied to each of a set of slot values to predict a target slot value by:
for each of the set of slot values utilized by a user, determining a probability that the particular slot value is the target slot value,
normalizing the probabilities of all of the slot values to infer a probability distribution over all of the slot values, and
identifying the target slot value using the inferred probability distribution;
a speech recognition component that provides a probability distribution associated with a speech input; and
a language model that determines the user goal based, at least in part, upon the probability distributions provided by the predictive user model and the speech recognition component.

* * * * *